United States Patent Office 3,410,832
Patented Nov. 12, 1968

3,410,832
PROCESS FOR THE COPOLYMERIZATION OF LAURIC LACTAM AND CAPROLACTAM
Wolfgang Griehl and Siegfried Schaaf, Chur, Switzerland, assignors to Inventa A.G. fur Forschung und Patentverwertung, Zurich, Switzerland
No Drawing. Filed Jan. 29, 1965, Ser. No. 429,129
Claims priority, application Switzerland, Jan. 30, 1964, 1,069/64
1 Claim. (Cl. 260—78)

ABSTRACT OF THE DISCLOSURE

A process for the production of polylauric lactam capable of after-polycondensation, wherein lauric lactam is subjected to a two-stage polymerization, the first stage being carried out at a temperature ranging from 300° C. to 330° C. under a steam pressure of more than 2 atmospheres, and the second stage at subatmospheric to slightly elevated pressures and somewhat lower temperature, oxygen being excluded in the second stage.

---

It is known to polymerize caprolactam by heating to 150–300° C. in the presence of reaction-promoting substances, such as carboxylic acids, acid chlorides, amine hydrochlorides, and water. In German Patent No. 748,253, for instance, 1 mol of caprolactam is heated with ⅓ mol of water for 4 hours to 225–230° C. and, after heating another 8 hours at 240–250° C., a spinnable product consisting of a high polymer is finally obtained. In the same patent, it is stated that lactams can be polymerized all the more easily, the larger the number of ring members, in any case up to 14 ring members. However, this assertion is not proved by examples in the specification. Actually, however, lauric lactam (13 ring members) cannot be polymerized within a time acceptable for practical purposes under the condition indicated in the patent. This is not surprising, since, in contrast to caprolactam, lauric lactam, when heated in acid solution under reflux, is not hydrolyzed to any substantial extent, even after days.

If, for example, lauric lactam is heated at the conventional polymerization temperature of 260° C. in the presence of water or small amounts of acids, more than 50% of the lauric lactam remains unconverted even after a polymerization time of 30 hours.

According to French patent specification No. 1,261,286, the polymerization of lauric lactam is carried out between 315° and 320° C. in the presence of catalytic amounts of aliphatic mono- or di-carboxylic acids. The additions of said acids act at the same time as viscosity stabilizers, so that after-condensation, which is necessary, cannot take place for the purpose of obtaining products of particularly high molecular weight by treatment with nitrogen below the melting point. The polylauric lactam obtained in this way is not suitable, for example, for producing high-grade tubes.

It has now been found that after-polycondensable polylauric lactam is obtained by polymerization of lauric lactam if the polymerization or copolymerization thereof is carried out for 0.5–10 hours at 300° C. to 330° C. under a steam pressure of more than 2 atmospheres gauge, and then for 0–10 hours with the exclusion of oxygen in vacuo, at normal pressure or somewhat elevated pressure. It is advantageous to stir in order to accelerate the reaction.

A conversion rate of 99–100% is obtained by this process. The polylauric lactam obtained in this way has a relative viscosity of 1.6 to 1.9 (measured as a 0.5% solution in m-cresol at 20° C.) and a melt viscosity of 1,000–6,000 poises at 270° C. and it can be forced out of the autoclave without any difficulty and cut into chips. The melting range is 178–182° C.

As the lactam still has both free amino and carboxyl groups, it can be conveniently after-condensed at temperatures below the melting point in a stream of inert gas to form highly viscous products.

To accelerate the after-condensation, small amounts, preferably $10^{-5}$ to $10^{-1}$ weight percent, of a phosphoric acid or $10^{-4}$ to 1 weight percent of sulphuric acid can be added to the lauric lactam.

The process can also be performed in the presence of heat and light stabilizers, delustering agents, fillers, color pigments, and the like. Furthermore, in order to obtain certain preselected viscosities in the end product, suitable amounts of the known chain limiters, such as mono- or polycarboxylic acids, mono- or polyamines, and the like, can be added. According to the process, copolyamides of lauric lactam can also be produced, for example, by adding caprolactam oenantholactam, and others.

In the following, the invention will be more fully explained in a number of examples, which are given by way of illustration and not of limitation.

EXAMPLE 1

3 kg. of lauric lactam were heated for 2 hours to 320° C. in a 5-liter stirring autoclave under a steam pressure of 45 atmospheres gauge. After the pressure was released, the polymer melt was worked up into chips. These showed an extract content of 0.4% by weight (extracted with methanol), a relative viscosity of 1.9 (0.5% in m-cresol at 20° C.), and a melt viscosity of 2,800 poises (at 270° C.).

The after-condensation of these chips was carried out at 170° C. under a stream of nitrogen of 5 liters/hour and per cubic centimeter of loose volume. After 30 hours, a relative viscosity of 2.2 and a melt viscosity of 10,000 poises at 270° C. were obtained.

The polylauric lactam after-condensed in this way can be worked up into high-quality tubes.

EXAMPLE 2

30 kg. of lauric lactam and 0.75 g. of orthophosphoric acid were heated for 6 hours to 300° C. in a 50-liter autoclave under a steam pressure of 20 atmospheres gauge. The pressure was then released and nitrogen was passed over the melt for 4 hours under normal pressure at 300° C. The polylauric lactam obtained had a melting point of 180° C. a relative viscosity of 1.85 and a melt viscosity of 1,800 poises (at 270° C.).

The after-condensation was effected at 168° C. under a stream of inert gas of 7 liters/hour and per cubic centimeter of loose volume in the course of 16 hours and resulted in a polylauric lactam which could be worked well in a screw press, and which had a melt viscosity of 18,000 poises (at 270° C.). The foils (50$\mu$) produced therefrom showed good properties in use (high strength, low water absorption, very slight permeability to water).

EXAMPLE 3

3 kg. of lauric lactam and 0.09 g. of concentrated sulphuric acid were heated for 5 hours to 300° C. in a 5-liter autoclave under a steam pressure of 28 atmospheres gauge. The pressure was then released and the product obtained was thereafter heated for another 3 hours to 250° C. under a vacuum of 100 mm. Hg. The polylauric lactam obtained had a relative viscosity of 2.0 and a melt viscosity of 28,000 poises (at 270° C.). It can be worked up without any difficulty into tubes having a very high bursting pressure.

EXAMPLE 4

250 grams of lauric lactam, 50 grams of caprolactam, 100 grams of water and 10 mg. of metaphosphoric acid were heated for about 1 hour to 310° C. in a 1-liter autoclave, a pressure of 35 atmospheres gauge being adjusted. After cooling to 270° C., the pressure was released and nitrogen at normal pressure was passed over the melt at this temperature for 8 hours.

The copolyamide obtained had a relative viscosity of 1.7 and a melt viscosity of 900 poises (at 270° C.).

The after-condensation was effected at 160° C. under a stream of nitrogen of 15 liters/hour and per cubic centimeter of loose volume in the course of 50 hours and resulted in polylauric lactam with a relative viscosity of 2.3 and a melt viscosity of 16,000 poises, which could be worked up into foils, tubes and shaped rods on a screw press.

What we claim is:

1. A process for copolymerization of lauric lactam with caprolactam which comprises subjecting said two lactams to a first stage of polymerization at about 300°–330° C. under a steam pressure of about 35 atmospheres gauge for 0.5 to 10 hours, then cooling to about 270° C. and maintaining the resulting melt with exclusion of oxygen for a number of hours, whereby a copolylactam product having a melt viscosity of 900 poises at 270° C. is obtained, and thereafter proceeding with a second stage polymerization at 160° C., for about 50 hours, with exclusion of oxygen, whereby a copolylactam having a melt viscosity of 16,000 poises is obtained.

References Cited

UNITED STATES PATENTS

| | | | |
|---|---|---|---|
| 2,241,321 | 5/1941 | Schlack | 260—78 |
| 3,015,652 | 1/1962 | Schnell et al. | 260—78 |
| 3,017,392 | 1/1962 | Butler et al. | 260—78 |
| 3,171,829 | 3/1965 | Wiesmer et al. | 260—78 |
| 3,216,976 | 11/1965 | Schwartz et al. | 260—78 |
| 3,317,482 | 5/1967 | Kunde et al. | 260—78 |
| 3,321,447 | 5/1967 | Kunde et al. | 260—78 |

FOREIGN PATENTS 582,517   9/1959   Canada.

WILLIAM H. SHORT, *Primary Examiner.*

H. D. ANDERSON, *Assistant Examiner.*